United States Patent [19]

Rosman

[11] Patent Number: 5,667,076
[45] Date of Patent: Sep. 16, 1997

[54] GOLD RETRIEVING PAN

[76] Inventor: Alexander Rosman, 1562 Darby Ave., Pomona, Calif. 91767

[21] Appl. No.: 418,669

[22] Filed: Apr. 7, 1995

[51] Int. Cl.⁶ .................................................. B03B 5/52
[52] U.S. Cl. ................................. 209/447; 209/506
[58] Field of Search ........................ 209/44, 446, 447, 209/485, 506

[56] References Cited

U.S. PATENT DOCUMENTS

| | | | |
|---|---|---|---|
| 1,064,854 | 6/1913 | Ord | 209/447 |
| 2,630,226 | 3/1953 | Streng | 209/447 |
| 4,162,969 | 7/1979 | Lagal | 209/447 |
| 4,290,527 | 9/1981 | Wright | 209/44 X |
| 4,319,994 | 3/1982 | Morgan | 209/447 |
| 5,447,239 | 9/1995 | Tubbs, Jr. | 209/506 X |

FOREIGN PATENT DOCUMENTS 980725   12/1975   Canada ................. 209/447

*Primary Examiner*—William E. Terrell
*Assistant Examiner*—Tuan Nguyen
*Attorney, Agent, or Firm*—Albert O. Cota

[57] ABSTRACT

An improved gold retrieving pan (10) that is used for either wet or dry gold panning. The pan (10) allows gold dust or gold nuggets to be expeditiously extracted from gold bearing sand. The pan (10) consists of an outer circular section (12) having an inner perimeter rim (18) that is integrally attached to an outer perimeter rim 28 of a shallow center circular section (24). Near the outer perimeter rim (28) of the center circular section (24) is located a gold trap structure (40) having an outward facing opening (42) and an inward perimeter edge (44). The edge (44) is attached to the surface of the center circular section (24). In front of the gold trap structure (40) is located a shallow, gold-setting trough (70) that functions in combination with the gold trap structure (40) to allow any gold dust and/or gold nuggets present in the gold bearing sand to remain within the confines of the gold trap structure (40) and the trough (70).

3 Claims, 2 Drawing Sheets

5,667,076

GOLD RETRIEVING PAN

TECHNICAL FIELD

The invention pertains to the general field of gold retrieving pan-type devices and more particularly to an improved gold retrieving pan that better facilitates the retrieving of gold dust and gold nuggets from gold bearing sand.

BACKGROUND ART

Since gold was discovered to be retrievable from rivers, lakes, streams and similar water passways, a "gold pan" has been used to separate the gold from other sediments which may also be present in the water and sand. As the pan is moved through the water or along the bed of a water passway, any object in the water or on the bed can be held and brought above the surface for inspection and removal of any gold that might be present. Once the water and/or sediment/sand has been collected into the pan by slightly shaking the pan from side-to-side, the objects within separate. The lighter objects float to the top of the water while the heavier objects, such as gold, sink to the bottom of the pan. Thus, allowing the gold to be distinguished from the invaluable objects that are also present in the sand and water.

Most conventional pan designs have relied on the dimensions of a simple pan. Incorporating a circular design having a larger outer perimeter that tapers into a smaller inner perimeter. There is no set standard size for a gold pan but commonly a diameter of between 10 and 18 inches has been relied upon to be most effective.

A gold pan can be made of almost any substance as long as the substance is waterproof, not water soluble and has the strength that is necessary to maintain rigidity when the water and the sand is being held within. Some pan designs have included ridges or other similar ideas to assist in the separating of the gold from the unwanted objects present.

A search of prior art in catalogs and industry periodicals did not disclose any gold pans that read directly on the claims of the instant application. In particular, a design of a gold pan that incorporates a gold trap that functions in combination with a gold settling trough was not found.

DISCLOSURE OF THE INVENTION

The improved gold retrieving pan is designed to allow persons that are "gold panning" to easily and more expeditiously determine if there is any gold dust and/or nuggets in an assumed gold bearing sand.

The inventive gold pan includes an outer circular section that slopes downward from its outer perimeter rim add terminates with an inner perimeter rim. The edge of the outer perimeter rim is bent-over to form a bead that adds to the structural integrity of the gold pan and to eliminate a potentially dangerous sharp edge. Integrally attached to the inner perimeter rim of the outer circular section is a center circular section that is formed with a flat, shallow cavity.

Near the outer perimeter rim of the center circular section is attached, to its upper surface, a gold trap structure. The gold trap has an outward facing opening that is near the inner side of a shallow, gold-settling trough. The outer side of the trough is adjacent the intersection of the inner perimeter rim and outer perimeter rim of the outer circular section and center circular section respectively.

To use the improved gold pan for panning gold, a quantity of sand and water is added to the pan and the pan is moved from side-to-side. The gold trap structure and the gold settling trough function in combination during the gold panning procedure, to allow any gold dust and/or nuggets present in the sand to settle within and around the area encompassing the trap and the trough.

In view of the above disclosure, it is the primary object of the invention to produce an improved gold retrieving pan that utilizes a gold trap and a gold-settling trough to facilitate the retrieval of gold dust and nuggets from gold bearing sand.

In addition to the primary object of the invention it is also an object to produce a gold pan that:

can be made in various diameters, can be utilized for both wet and dry gold panning, saves time, is easier to use, can be used by both children and adults, and is cost effective from both a consumer and manufacturer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment that allows gold dust and/or nuggets to be retrieved from sand in less than one-minute. The preferred embodiment as shown in FIGS. 1–7 is comprised of the following three major elements: a gold retrieving pan 10, a gold trap structure 40 and a shallow, gold-settling trough 70.

Figure 1:
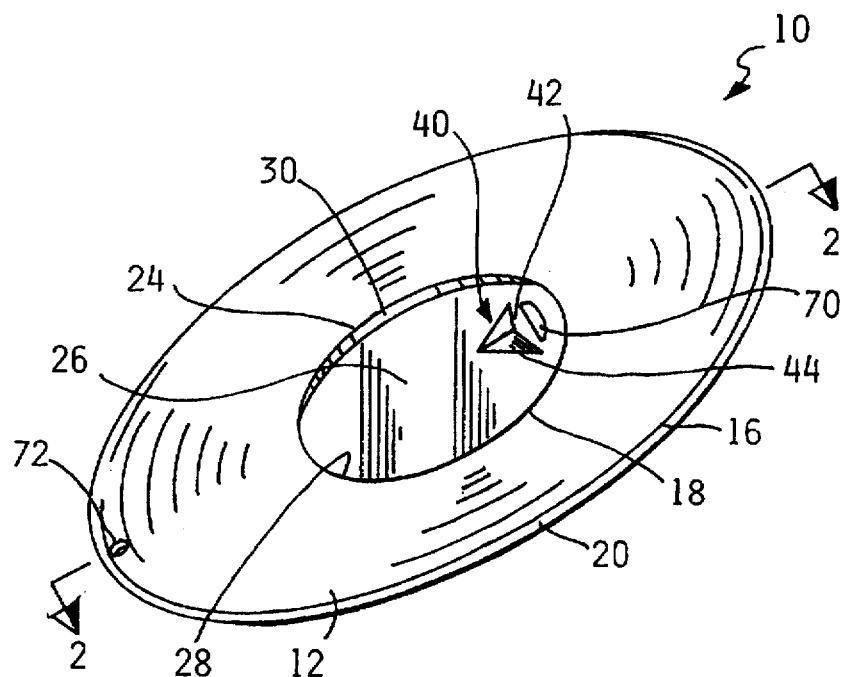
FIG. 1 is a perspective view of the improved gold retrieving pan showing the relative location of the outer circular section, the center circular section, the gold trap structure and the shallow, gold settling trough.
Figure 2:
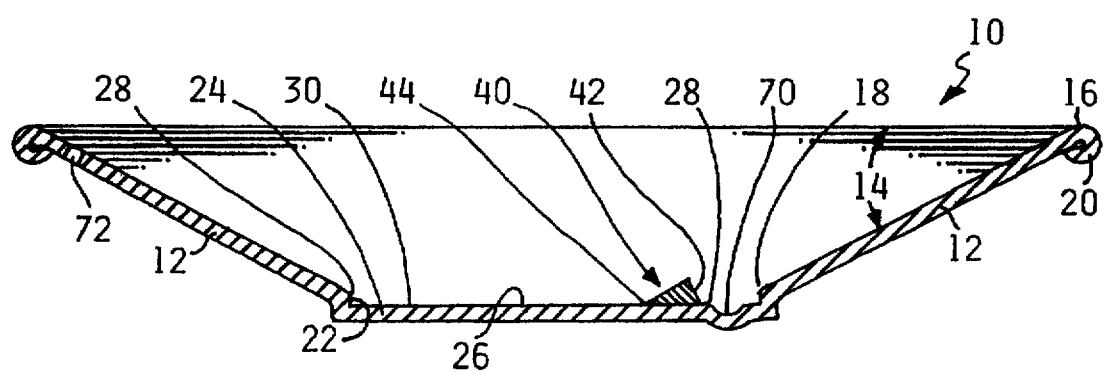
FIG. 2 is a side elevational, cross-sectional view of the gold retrieving pan taken along the lines 2—2 of FIG. 1.

The gold retrieving pan 10 is comprised as shown in FIGS. 1 and 2, of an outer circular section 12 that has a downward slope 14. The section 12 terminates with an outer perimeter rim 16 and an inner perimeter rim 18. As shown best in FIG. 2, the outer perimeter rim 16 includes a reinforcing bead 20. The bead 20 which is preferably formed by rolling the edges inward, adds to the structural integrity of the pan 10 and eliminates a potentially dangerous sharp edge. The outer circular section 12 can also include a gold-pan hanging bore 72 that is in alignment with the center of the gold trap structure 40. The bore allows the gold pan 10 to be hung on a peg (not shown) that is mounted to a vertical surface, and is used as a center mark to allow the gold trap structure 40 to be centrally maintained during the gold panning procedure.

The center circular section 24 as also shown in FIGS. 1 and 2, has a substantially flat upper surface 26 and an outer perimeter rim 28 that is integral with the inner perimeter rim 18 of the outer circular section 12.

In the preferred embodiment, the inner perimeter rim 18 of the outer circular section has a downward taper 22, that typically ranges, as measured from a horizontal plane from 30° to 90° as best shown in FIG. 2. The downward taper 22 allows the center circular section 24 to consist of a substantially flat, shallow cavity 30. The shallow cavity allows a quantity of gold bearing sand to be reasonably contained within the cavity as described infra in the OPERATION section.

The primary inventive element of the improved gold pan 10 is the gold trap structure 40. In its basic form, as shown best in FIGS. 1, 3 and 4, the gold trap structure has an outward facing opening 42 and an inward perimeter edge 44. The edge 44 is attached by an attachment means 46, to the upper surface 26 of the center circular section 24. When attached, the outward facing opening 42 is positioned near the outer perimeter rim 28 of the center circular section 24.

The gold trap structure 40 is disclosed in two designs. However, other structure configurations can function equally well. In either design, the gold trap structure 40 functions to trap gold dust and nuggets separated from gold bearing sand.

Figure 3:
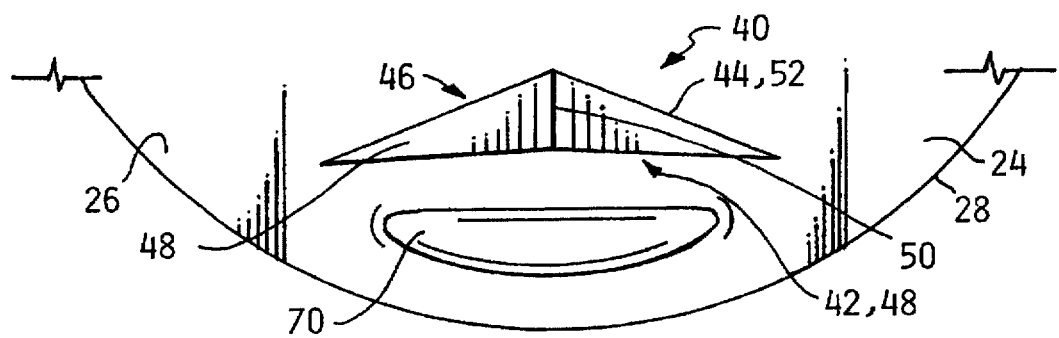
FIG. 3 is a top plan view of a triangular shaped, gold trap structure shown adjacent a gold-settling trough.
Figure 4:
FIG. 4 is a front elevational view of the triangular shaped, gold strap structure and the gold-settling trough of FIG. 3.

The first gold trap structure 40 as shown in FIGS. 3 and 4, has an outward facing, triangular shaped opening 48 with a centered apex 50. From the apex 50, the opening angles outward and downward as best shown in FIG. 4. The inward perimeter edge 44 also has a triangular edge 52 that tapers outward as viewed from the centered apex 50 as shown in FIG. 3.

Figure 5:
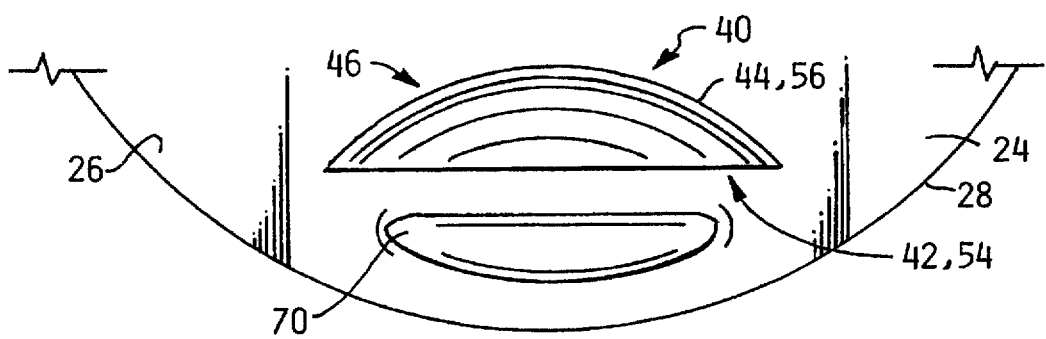
FIG. 5 is a top plan view of a semi-circular shaped, gold trap structure shown adjacent a gold-settling trough.
Figure 6:
FIG. 6 is a front elevational view of the semi-circular shaped, gold trap structure and the gold-settling trough of FIG. 5.

The second gold trap structure 40 as shown in FIGS. 5 and 6, has an outward facing semi-circular opening 54 and a semi-circular inward perimeter edge 56. This design is spaced, attached and functions as previously described for the first gold trap structure 40.

Figure 7:
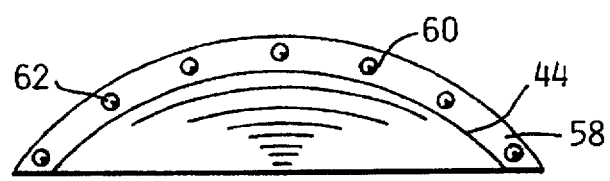
FIG. 7 is a top plan view of a gold trap structure that includes a contiguous mounting tab that allows the structure to be attached to the upper surface of the center circular structure by a plurality of bolts or rivets.

The outer circular section 12, the center circular section 24 and the gold trap structure 40 are preferably constructed of metal, such as steel. However, the above elements may also be constructed of a high impact plastic. If the elements are constructed of a metal, the attachment means 46 for attaching the inward perimeter edge 44 of the gold trap structure 40 to the center circular section 24 can be comprised of a welding process or a brazing process. Alternatively, the inward perimeter edge 44 of the gold trap structure 40 can include a substantially flat, contiguous mounting tab 58 as shown in FIG. 7. The tab 58 includes a plurality of tab bores 60 that are aligned with an equal plurality of attachment bores (not shown) located on the center circular section 24. Into each of the bore pairs, is inserted a screw or preferably a rivet 62 which provides the means for attaching the inward perimeter edge 44 of the gold trap structure 40 to the center circular section 24.

If a high impact plastic is used to construct the elements of the improved gold pan 10, the means for attaching the gold trap structure 40 to the center section can consist of an adhesive 54.

The final inventive element disclosed is the shallow, gold-settling trough 70. The trough as shown best in FIGS. 1, 2, 3 and 5 is located longitudinally across the outward facing opening 42 of the gold trap structure 40; and laterally between the outward facing opening 42 and the outer perimeter rim 28 of the center circular section 24. The trough 70 functions in combination with the gold trap structure 40 to contain the gold dust and nuggets found during the gold panning operation.

OPERATION

The improved gold retrieving pan 10 can be used for both wet panning and dry panning.

To use the gold pan for wet panning the following steps are followed:

1. Remove a portion of possible gold bearing sand from a sluice box or a dry washer. Material up to 0.5 inches in diameter may remain in the sand.
2. Place the portion of the sand into the gold pan 10.
3. Add an equal portion of water to the sand placed in the gold pan.
4. Shake the gold pan 10 from side-to-side for approximately 30 times while slightly tilting the gold pan away from the body just enough so that the water remains in the gold pan 10.
5. Tilt the gold pan 10 towards the body and vibrate the gold pan while simultaneously moving it from side-to-side until all unwanted sand is opposite the gold trap structure 40.
6. Scrape out the unwanted sand from the gold pan with a paddle or the like.
7. Pour out the dirty water and add one-half pint of clean water making sure not to pour the added water directly over the gold trap 40.
8. Tilt the gold pan 10 away from the body and shake the gold pan 10 from side-to-side.
9. Slowly flow the water in a circular motion over the gold trap 40 and the shallow, gold-settling trough 70.
10. Reverse the direction of the circular water flow until gold dust or gold nuggets are visible and ready for their retrieval.

To use the gold pan 10 for dry panning the following steps are followed:

1. Remove a portion of gold bearing sand from a dry washer and place into the gold retrieving pan 10. Material up to 0.5 inches in diameter may remain in the sand.
2. Shake the gold pan 10 from side-to-side, 4 to 5 times while maintaining the gold pan in a substantially horizontal plane.
3. Tip the gold pan 10 away from the body and shake from side-to-side, 30–40 times.
4. Tilt the gold pan 10 towards the body and vibrate the gold pan while simultaneously moving it from side-to-side until all unwanted sand is opposite the gold trap structure 40.
5. Blow air lightly over the sand located in the vicinity of the gold trap and the gold-settling trough 70 to check for any visible gold and/or nuggets present in the sand.
6. Remove the tailings from the gold pan by tipping the gold pan away from the gold trap.
7. Place the remaining sand located in the gold pan into a container for a later gold retrieval.

While the invention has been described in complete detail and pictorially shown in the accompanying drawings, it is not to be limited to such details, since many changes and modifications may be made to the invention without departing from the spirit and the scope thereof. Hence, it is described to cover any and all modifications and forms which may come within the language and scope of the claims.

I claim:

1. An improved gold retrieving pan comprising:
   a) an outer circular section having a downward slope and an outer perimeter rim, and an inner perimeter rim,
   b) a center circular section having a substantial flat upper surface and an outer perimeter rim integral with the inner perimeter rim of said outer circular section, wherein the inner perimeter rim of said outer circular section tapers downward at the intersection with the outer perimeter rim of said center circular section wherein the downward taper, which typically ranges as measured from a horizontal plane from 30° to 90°, allows said center circular section to consist of substantially flat, shallow cavity, and
   c) a gold trap structure having an outward facing opening and an inward perimeter edge, wherein said outward facing opening has a triangular shape with a centered apex from where the opening angles outward and downward, and an inward perimeter edge that tapers outward from the centered apex, wherein the inward perimeter edge is attached by an attachment means, to the upper surface of said center circular section, wherein when attached, the outward facing opening is positioned near the outer perimeter rim of said center circular section.

2. The gold retrieving pan as specified in claim 1 wherein said center circular section further comprises a shallow, gold-settling trough located longitudinally across the outward facing opening of said gold trap structure and laterally between the outward facing opening of said gold trap structure opening and the outer perimeter rim of said center circular section.

3. An improved gold retrieving pan comprising:
   a) an outer circular section constructed of a metal and having a downward slope and an outer perimeter rim, and an inner perimeter rim,
   b) a center circular section constructed of a metal and having a substantial flat upper surface and an outer perimeter rim integral with the inner perimeter rim of said outer circular section, wherein the inner perimeter rim of said outer circular section tapers downward at the intersection with the outer perimeter rim of said center circular section wherein the downward taper, which typically ranges as measured from a horizontal plane from 30° to 90°, allows said center circular section to consist of substantially flat, shallow cavity, and
   c) a gold trap structure constructed of a metal having an outward facing opening and an inward perimeter edge, wherein said outward facing opening has a triangular shape with a centered apex from where the opening angles outward and downward, and an inward perimeter edge that tapers outward from the centered apex, wherein the inward perimeter edge further comprises a substantially flat, contiguous mounting tab having a plurality of tab bores therethrough that are aligned with an equal plurality of attachment bores located on said center circular section, where into the bore pairs is inserted a rivet that provides a means for attaching the inward perimeter edge of said gold trap structure to said center circular section.

* * * * *